(12) United States Patent
Haas

(10) Patent No.: US 10,259,061 B2
(45) Date of Patent: Apr. 16, 2019

(54) CIRCULAR SAW

(75) Inventor: Guenter Haas, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 13/193,324

(22) Filed: Jul. 28, 2011

(65) Prior Publication Data

US 2012/0023760 A1 Feb. 2, 2012

(30) Foreign Application Priority Data

Jul. 30, 2010 (DE) .................. 10 2010 038 676

(51) Int. Cl.
| | |
|---|---|
| *B23D 45/16* | (2006.01) |
| *B23D 59/00* | (2006.01) |
| *B27B 9/00* | (2006.01) |
| *B27G 19/04* | (2006.01) |
| *B23Q 11/00* | (2006.01) |
| *B27G 3/00* | (2006.01) |

(52) U.S. Cl.
CPC .......... *B23D 59/006* (2013.01); *B23D 45/16* (2013.01); *B23Q 11/0042* (2013.01); *B27B 9/00* (2013.01); *B27G 3/00* (2013.01); *B27G 19/04* (2013.01); *Y10T 83/7734* (2015.04)

(58) Field of Classification Search
CPC ........ B23D 45/16; B23D 59/006; B27B 9/00; B27G 19/02; B27G 19/04; B27G 3/00; B23Q 11/0042; B23Q 11/0046; B24B 55/102; Y10T 83/7734
USPC .................................... 30/390, 391; 83/478
See application file for complete search history.

(56) References Cited

U.S. PATENT DOCUMENTS

| | | | | |
|---|---|---|---|---|
| 4,466,187 | A | * | 8/1984 | Morimoto ...................... 30/124 |
| 4,675,999 | A | | 6/1987 | Ito et al. |
| 5,033,192 | A | | 7/1991 | Franz et al. |
| 5,327,649 | A | | 7/1994 | Skinner |
| 5,537,748 | A | | 7/1996 | Takahashi et al. |
| 5,911,482 | A | | 6/1999 | Campbell et al. |
| 6,536,120 | B1 | * | 3/2003 | Langis ........................... 30/391 |
| 2004/0134076 | A1 | | 7/2004 | Moore et al. |
| 2007/0163409 | A1 | * | 7/2007 | Nishikawa et al. . B23D 45/048 |
| | | | | 83/485 |

FOREIGN PATENT DOCUMENTS

| | | |
|---|---|---|
| CA | 1 266 601 A1 | 3/1990 |
| DE | 35 40 625 C2 | 6/1986 |

(Continued)

OTHER PUBLICATIONS

European Search Report, dated Dec. 16, 2011, 8 pages total.
(Continued)

*Primary Examiner* — Clark F Dexter
(74) *Attorney, Agent, or Firm* — Crowell & Moring LLP

(57) ABSTRACT

A circular saw, in particular hand circular saw, is disclosed. The circular saw has a workpiece support surface, a saw blade and a protective cover, which covers the saw blade in a region above a workpiece to be processed. The protective cover has such a geometry and position with respect to the saw blade that a straight line, which originates from the first deflection of a tangent applied at the intersection of the saw blade circumference with the workpiece support surface from the protective cover encloses an angle of up to 30°, in particular up to 20°, with a line perpendicular to the workpiece support surface.

8 Claims, 3 Drawing Sheets

(56) References Cited

FOREIGN PATENT DOCUMENTS

| | | | |
|---|---|---|---|
| DE | 35 00 371 C2 | 7/1986 | |
| EP | 0 407 339 B1 | 1/1991 | |
| EP | 2 412 502 B1 | 11/2013 | |
| JP | 61-87901 U | 6/1986 | |
| JP | 63-7218 * | 1/1988 | ............... 30/391 |
| JP | H03 11518 U | 2/1991 | |

OTHER PUBLICATIONS

German Search Report, dated Mar. 29, 2011, 2 pages total.
Japanese Office Action dated Feb. 24, 2015, with English translation (Six (6) pages).
Chinese Office Action dated Jun. 23, 2015, with partial English translation (Eight (8) pages).
Japanese Office Action issued in Japanese counterpart application No. 2011-168740 dated Oct. 13, 2015, with partial English translation (Ten (10) pages).

\* cited by examiner

CIRCULAR SAW

This application claims the priority of German Patent Document No. 10 2010 038 676.6, filed Jul. 30, 2010, the disclosure of which is expressly incorporated by reference herein.

BACKGROUND AND SUMMARY OF THE INVENTION

The invention relates to a circular saw, in particular a hand circular saw, having a workpiece support surface, a saw blade and a protective cover, which covers the saw blade in a region above a workpiece to be processed.

Chip deflection is extremely important for hand circular saws, above all for metal saws, so that the hot chips flying around cannot fly at the operator. For this reason, arch-shaped protective covers are drawn around the upper half of the saw blade. These protective covers terminate with a flat so-called support plate. The lower side of the flat support plate forms the workpiece support surface, with which the circular saw slides along the surface of the workpiece.

Precisely in the case of metal circular saws, there is the problem that the often transparent or partially transparent protective covers become matted when the hot metal chips strike them.

The object of the invention is allowing an improved chip removal from the circular saw.

This is achieved by a circular saw of the type mentioned at the outset in that the protective cover has such a geometry and position with regard to the saw blade, that a straight line, which originates from the first deflection of a tangent applied at the intersection of the saw blade circumference with the workpiece support surface from the protective cover, encloses an angle of up to 30°, in particular of up to 20°, with a line perpendicular to the workpiece support surface.

The chip flies away linearly from the intersection of the saw blade circumference with the workpiece support surface and describes a straight trajectory, which is determined by the tangent on the saw blade circumference. The chip hits the protective cover and ricochets off, i.e., deflects, wherein the angle of impact is equal to the angle of deflection. The trajectory of the ricocheted chip after its first deflection, i.e., after the first impact on the protective cover, also describes a straight line. However, this straight line does not run in the direction of the operator's arm, as in the prior art, but essentially perpendicular to the workpiece support surface, i.e., in an angular range of ±30° to the perpendicular. If the workpiece support surface is aligned horizontally, then the chips fly essentially vertically. The result of this is improved protection, on the one hand, and, on the other hand, the interior of the protective cover is not stressed as much, because the impact angle of the chip on the inner side of the protective cover is very flat as compared to the prior art. In order to achieve this flat angle of impact, the protective cover is pulled very close to the saw blade as compared to the prior art.

The distance, and namely the shortest distance of the protective cover measured in the region of the workpiece support in the radial direction, is a maximum of 10 mm from the circumference of the saw blade.

In addition, as an alternative to this short distance, the tangent hits the protective cover at a distance of a maximum of 20 mm from the workpiece. This short distance also ensures that the speed of the chip is reduced very quickly, because it bounces off the protective cover at an early stage.

The aforementioned object is also attained or the aforementioned solution is improved in that the protective cover has axially opposing side walls, which partially cover the saw blade in the axial direction, and in that the strips, which run axially toward one another and preferably concentric to the saw blade, project from the inner side of the side walls radially inwards of the saw blade circumference. These strips or arch-shaped extensions, which extend towards the side surface of the saw blade without making contact therewith, shield the toothed circumference of the saw blade radially inwardly somewhat, so that a type of chamber to accommodate chips is produced. This is supposed to prevent chips from being able to leave the protective cover in the direction of the center of rotation.

The protective cover has a viewing area, i.e., at least one viewing area, which clears a view of the cutting site. This viewing area preferably abuts the workpiece support surface.

In order to keep the viewing area, which is formed in particular by a transparent plastic, from becoming matted because of the hot chips, according to the invention, a separate baffle plate is provided on the radial inner side of the protective cover. The metal chips therefore have their first contact with this baffle plate.

According to the preferred embodiment, the baffle plate is made of metal.

In the region of or around the baffle plate, the protective cover is made of transparent plastic so that the view of the cutting site is obstructed only by the metal plate, something that is not annoying overall, and especially since the plastic around the baffle plate does not get matted.

In order to fix the baffle plate in an optimal manner, it is fastened internally on the rest of the protective cover, i.e., the protective cover is at least two layers in the region of the baffle plate, as viewed in the radial direction. The baffle plate may also be fastened on the rest of the protective cover so that it is replaceable, which is advantageous in particular in the case of metal circular saws.

According to the preferred embodiment, the protective cover has a main section. This main section serves to fasten the protective cover on the tool side and is preferably made of non-transparent material. In a normal case, the main section will also form the largest portion of the protective cover and also serves as the support member so to speak.

The main section in this case may be made of another material than the baffle surface and the viewing area, preferably a non-transparent plastic.

It must be emphasized that the viewing area may be designed under some circumstances as an open inspection window or a combination of an open inspection window with a transparent cover.

In addition, an embodiment is also conceivable in which the viewing area, baffle surface and main section are made of transparent plastic.

Besides the baffle surface with the baffle plate, which is provided for the first deflection of the chips, additional baffle plates may also be provided internally on the protective cover in order to prevent damage to other heavily stressed regions of the protective cover. This is advantageous in particular in the case of a plastic design of the protective cover.

Additional features and details of the invention are disclosed in the following description and in the drawings to which reference is made.

DETAILED DESCRIPTION OF THE DRAWINGS

Figure 1:
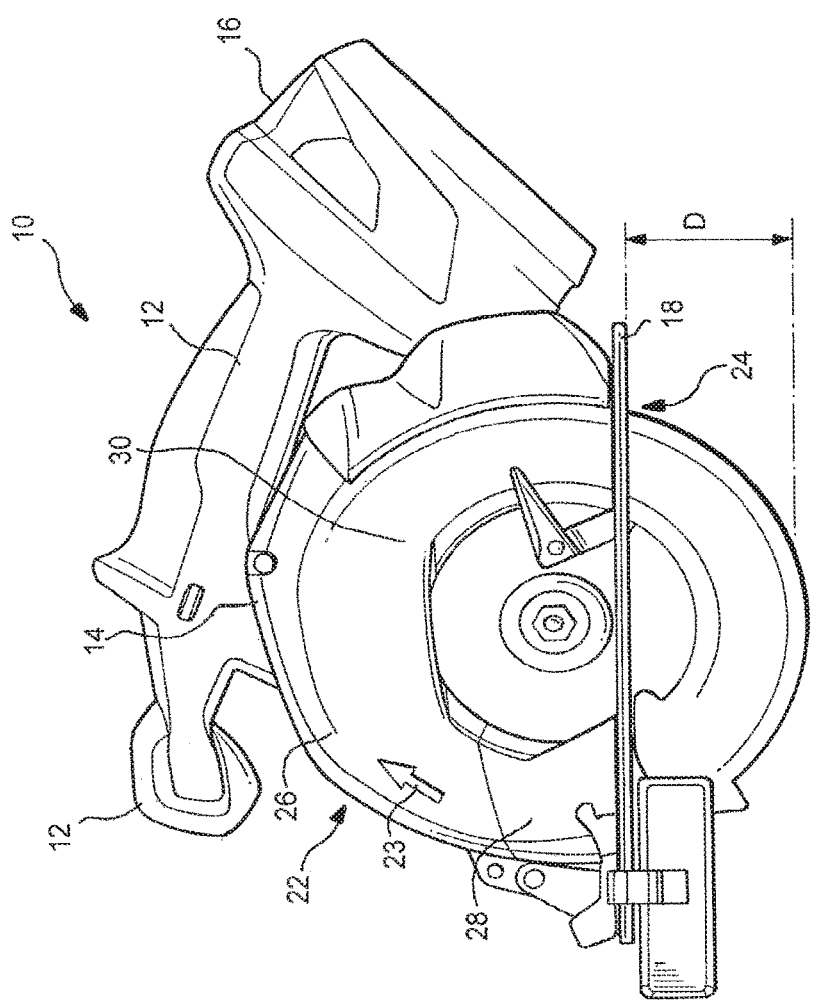
FIG. 1 is a side view of a hand circular saw according to the invention.

FIG. 1 shows an electric hand circular saw 10. The structure of the hand circular saw 10 corresponds essentially to that of a conventional hand circular saw with two hand grips 12, a drive unit 14, which is supplied in this case by a battery 16, a support plate 18 and a saw blade 20, which projects through a recess of the support plate 18 and is partially surrounded in an arch-shaped manner by an upper protective cover 22 described in more detail in the following. The rotational direction of the saw blade 20 is identified by an arrow 23.

The lower side of the support plate 18 forms a workpiece support surface 24, with which the hand circular saw 10 can be placed on a workpiece to be processed and guided along the surface of the workpiece. The penetration depth D of the saw blade 20 into the workpiece may be adjusted optionally in order to obtain an ideal cut image independent of the thickness and the material of the workpiece. If need be, the saw blade 20 may also be tilted toward the support plate 18 in order to make diagonal cuts.

The protective cover 22 covers the saw blade 20 in the region above the support plate 18. This serves to protect the operator from injuries from the saw blade 20. In addition, the operator is protected from flying chips, which the saw blade 20 frees from the workpiece.

The protective cover 22 is assembled in this case of multiple parts, with a main section 26 made of a non-transparent plastic and a viewing area 28 made of a transparent plastic. The plastic part is fastened on the main section 26 so that it is replaceable.

The viewing area 28 is arranged in the forward part of the protective cover 22 directly adjacent to the support plate 18 so that, even when the protective cover 22 is closed, a clear view of the intersection of the saw blade 20 is possible in order to be able to control cutting guidance and cutting quality.

The remaining circumference of the protective cover 22 is formed by the main section 26, with which the protective cover 22 is also fastened on the housing of the hand circular saw 10.

However, the viewing area 28 could also be configured, for example, as an inspection window arranged in the main section 26.

Figure 3:
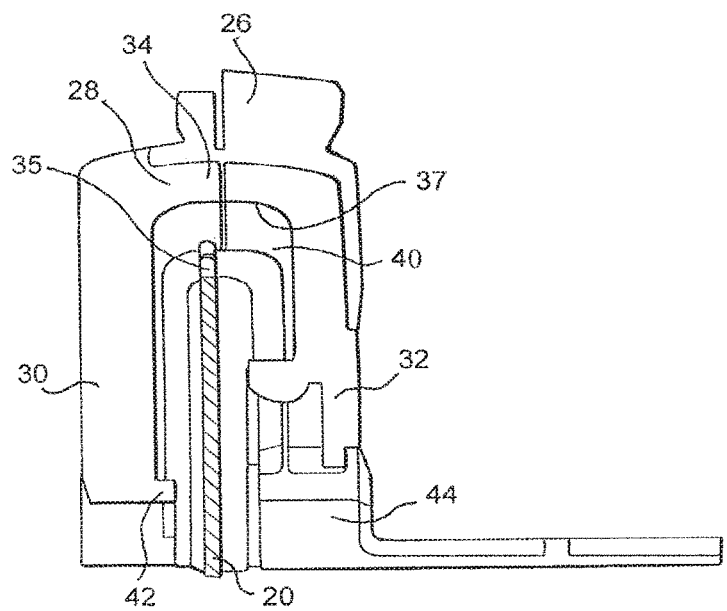
FIG. 3 is a horizontal sectional view through the protective cover of the hand circular saw from FIG. 1.
Figure 4:
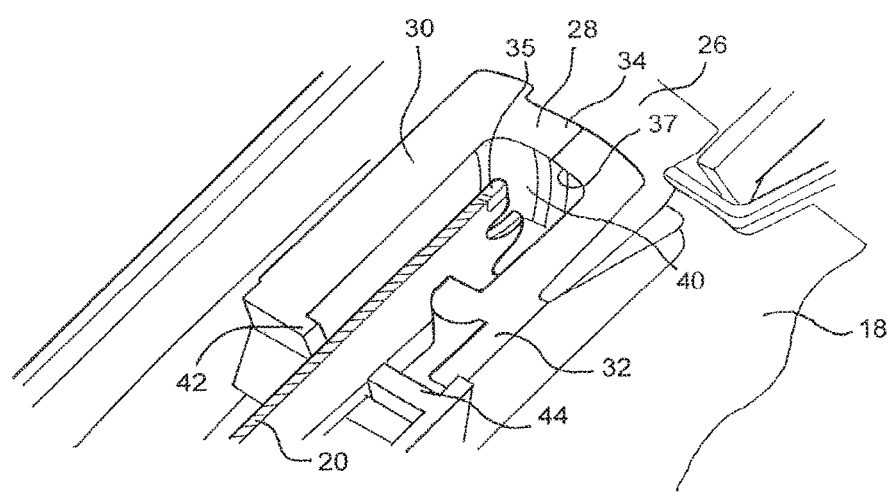
FIG. 4 is a perspective view of the sectional view in FIG. 3.

As FIGS. 3 and 4 in particular show using the example of the viewing area 28, the main section 26 and viewing area 28 are respectively formed of two parallel side walls 30, 32 and a connecting section 34. The side walls 30, 32 are configured essentially in the shape of a circular ring section, wherein the outer radius is greater than the radius of the saw blade 20 and the inner radius is less than the radius of the saw blade 20. In other words, the side walls cover the saw blade laterally in the region of the saw teeth 35. The connecting section 34 represents the connection between the side walls 30, 32 and forms a radial cover of the saw blade 20, which protects the operator from flying chips, as described in the following.

Figure 2:
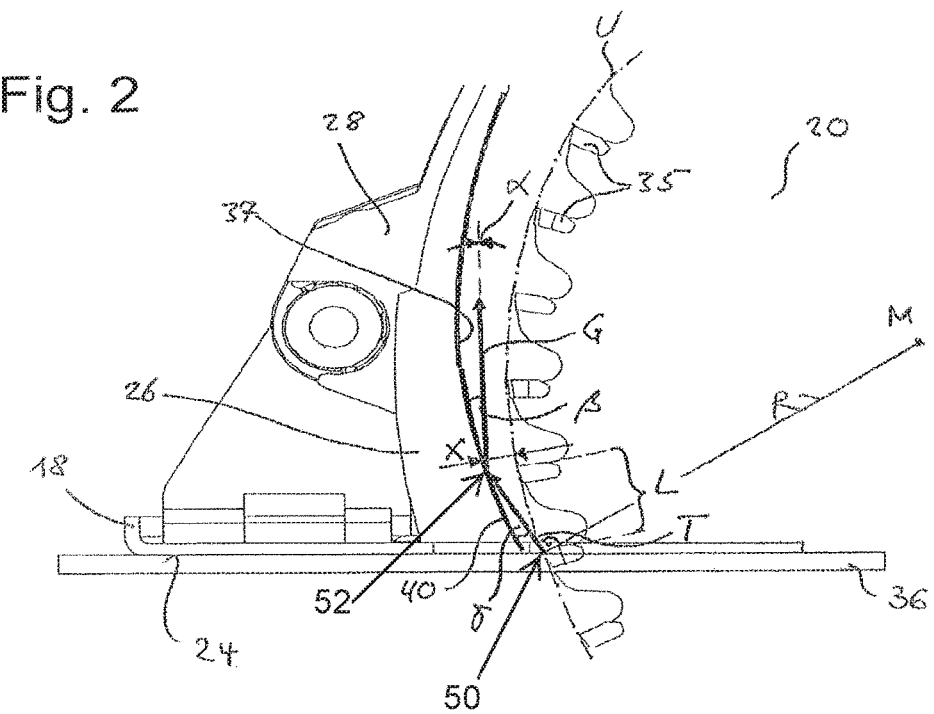
FIG. 2 is a vertical sectional view through the protective cover of the hand circular saw from FIG. 1.

As FIG. 2 shows, chips that are freed from the workpiece 36 by the saw blade 20 are flung away from it through the rotation of the saw blade 20 directly after leaving the workpiece 36 on a straight line (tangent T) running tangentially to the saw blade 20. The tangent T abuts at the intersection of the saw blade circumference U (enclosed end of the saw blade) with the support surface 24. The center point M of the saw blade circumference U and a radius R running to the base point of the tangent are depicted in FIG. 2. This base point 50, or intersection point 50, is the aforementioned intersection of the saw blade circumference U with the support surface 24. The chips impact a deflection point 52 on the inner side 37 of the protective cover 22 at a flat angle γ and ricochet off the same. The angle of deflection ß corresponds in this case to the angle of impact γ on the inner side 37 of the protective cover 22. Because of the high speed of the chips, the further trajectory continues to follow essentially along a straight line G. Provided additionally in this case, in the region of the deflection point 52 in which the chips impact on the inner side 37 of the protective cover 22, is a baffle plate 40 made of metal, which has a higher resistance to the hot chips than the rest of the cover 22.

In the case of protective covers 22 that have been used until now, the chips impact the protective cover 22 at a relatively steep angle. The result of this is, for one, that the protective cover 22 is very heavily stressed, which leads to the viewing area 28 quickly getting cloudy. Secondly, the chips are deflected at a relatively steep angle so that they are flung in the direction of the center of rotation of the saw blade 20.

The protective cover 22 of the hand circular saw 10 according to the invention is configured so that chips impact the protective cover 22 at a relatively flat angle γ. As a result, the bounce angle ß is likewise smaller so that the trajectory of the chips encloses an angle α of a maximum of 30°, preferably a maximum of 20°, with a line perpendicular to the support plate 18. In other words, the chips bounce off the inner side 37 of the protective cover 22 at such a flat angle that the further trajectory runs within the side walls 30, 32. This safely prevents the chips from exiting from the protective cover 22 at a high speed even after deflection.

In order to intensify this effect, the protective cover 22 is pulled very close to the saw blade 20. The shortest distance X from the protective cover 22 is less than 10 mm in this region. As a result, the distance L of the deflection point from the workpiece 36, at which the saw chips impact the protective cover 22, is also less than 20 mm, measured along the tangent T. In other words, the chips impact the viewing area 28 only in the lower region so that the region above it is protected from flying chips and therefore from clouding.

The baffle plate 40 is fastened on the protective cover 22 so that it is replaceable, in particular on the inner side of the viewing area 28, so that in the event of excessive wear it is possible to replace the baffle plate 40.

However, embodiments without an additional baffle plate 40 are also conceivable as an option. In such an embodiment, the chips impact directly on the protective cover 22 or on the viewing area 28. Because of the flat impact angle, in this case as well, the wear is substantially less than with protective covers used until now so that a clouding of the viewing area is prevented or at least delayed.

In order to provide additional protection from chips flying around, strips 42, 44 directed axially in the direction of the saw blade 20 are formed on the inner side of the side walls 30, 32 as shown in FIGS. 3 and 4. These strips 42, 44 are arranged radially inwards of the saw blade 20 and run concentric to the saw blade 20.

Because of these strips 42, 44, the exit region on the inner radius of the side walls 30, 32, where chips can exit from the protective cover 22, is further reduced. The chips are guided to some extent into a channel that runs concentric to the circumference of the saw blade 20 and surrounds the saw teeth 35. For example, a suction mechanism which sucks the chips out of this channel may be attached to the protective cover as an option.

As FIG. 3 shows, the cover is designed to be partially multi-layered in the region of the viewing area 28 (baffle plate (not shown) viewing area 28 and supporting main section 26).

The inner side of the connecting section 34 runs in an arch-shaped manner and preferably without an offset despite the different parts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A circular saw, comprising:
    a workpiece support plate with a workpiece support surface, the workpiece support surface defining a plane;
    a saw blade having a circumference; and
    a protective cover which covers the saw blade, wherein the protective cover has an arcuate inner surface with a deflection point that is defined on the arcuate inner surface, wherein the deflection point is located on a straight line that originates from an intersection point of the saw blade circumference and the plane of the workpiece support surface, wherein the straight line is tangent to the saw blade circumference;
    wherein a radial distance between the arcuate inner surface and the saw blade circumference is measured on a radial line of the saw blade, and wherein the radial distance is smallest where the radial line intersects the arcuate surface at a plane of the workpiece support plate and continuously increases as the radial line rotates along the arcuate inner surface in a direction away from the workpiece support plate and past the deflection point;
    wherein the deflection point is less than 20 mm from the intersection point as measured on the straight line;
    wherein the deflection point is less than 10 mm from the saw blade circumference; and
    wherein the arcuate inner surface includes a baffle plate, the deflection point being disposed on the baffle plate.

2. The circular saw according to claim 1, wherein the protective cover has axially opposing side walls each of which partially covers the saw blade in an axial direction, and wherein an inner side of each of the side walls has a strip extending therefrom.

3. The circular saw according to claim 1, wherein the protective cover has a viewing area, wherein the viewing area abuts the workpiece support surface.

4. The circular saw according to claim 1, wherein the protective cover is made of a transparent plastic at least in a region of and/or around the baffle plate.

5. The circular saw according to claim 1, wherein the baffle plate is fastened internally on the protective cover.

6. The circular saw according to claim 1, wherein the protective cover has a main section fastened on a housing of the circular saw, wherein the main section is made of a non-transparent material.

7. The circular saw according to claim 6, wherein the main section has a recess for a viewing area.

8. The circular saw according to claim 1, wherein the circular saw is a hand circular saw.

* * * * *